[United States Patent Office — 3,014,000, Patented Dec. 19, 1961]

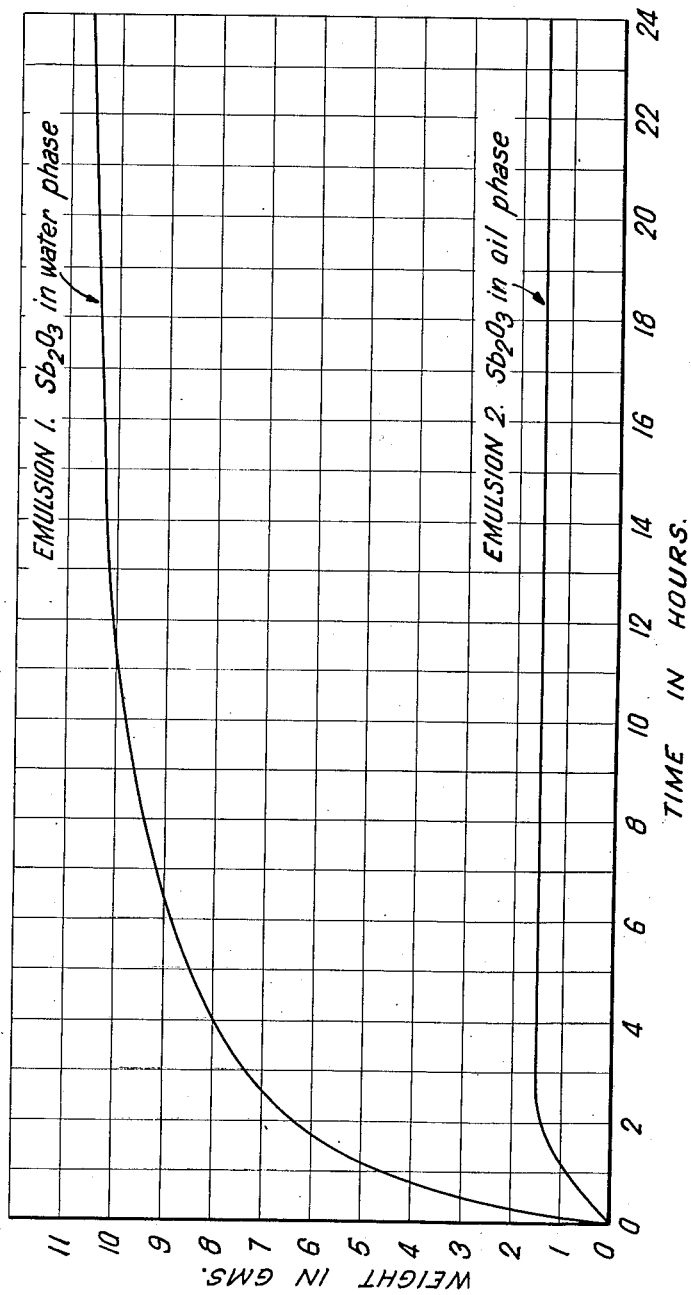

3,014,000
FLAME-RETARDING COMPOSITIONS
Norman John Read, Greenford, England, assignor to Associated Lead Manufacturers Limited, London, England
Filed Feb. 8, 1960, Ser. No. 7,403
11 Claims. (Cl. 260—28.5)

This application is a continuation-in-part of my application Serial No. 581,834, filed May 1, 1956 and now abandoned.

Flame-retarding compositions for application to fabrics have been proposed comprising a dispersion in water in suitable proportions of polyvinyl chloride or the like (by which expression is meant a homopolymer of vinyl chloride, a homopolymer of vinylidene chloride, a copolymer of vinyl chloride and vinylidene chloride or a mixture of said polymers), antimony trioxide and a plasticizer.

All such compositions as have been previously proposed leave a thick coating on the treated fabric and are accordingly entirely unsuitable for the treatment of light-weight cotton or other fabrics, e.g. flannelette, to be used for the manufacture of articles of apparel, such as women's and children's nightwear.

It has also been proposed to incorporate, as flame-proofing ingredients, in flame-retarding compositions containing plasticized polyvinyl chloride, water-soluble inorganic substances, such as ammonium phosphate. Such phosphates are, however, inevitably removed from the treated fabric upon laundering, with the result that the flame-proofing effect is entirely or almost entirely lost.

The many fatal accidents which have occurred owing to ladies' or children's garments catching fire have made it a matter of extreme importance to textile manufacturers to have available to them a flame-resisting composiiton which can be applied to such fabrics without destroying the soft handle of the treated fabrics and which will not lose its flame-retardant effect even after repeated laundering.

It is accordingly an object of the invention to provide a flame-retardant composition constituted by a dispersion in water of plasticized polyvinyl chloride or the like and antimony trioxide which will not impart objectionable stiffness to fabric treated therewith.

Another object of the invention is to provide such a flame-retardant composition which may be applied to cotton and other fabrics suitable for wearing apparel without destroying the soft handle of the fabric and which will retain its flame-retardant effect notwithstanding repeated laundering of the treated fabric.

Flame-retarding compositions of the indicated character, as hitherto utilized have contained the antimony trioxide dispersed in the water phase of the composition and I have found that the antimony trioxide then tends to settle out from the composition, which necessitates vigorous agitation of the dispersion during application to the material to be treated, which may result in non-uniform treatment of said material.

It is a further object of the invention to provide a novel flame-retardant composition from which the antimony trioxide has little or no tendency to settle out on storage and a method for the production of such composition.

The invention accordingly provides a flame-retarding composition for application to textile fabrics and adapted to impart a soft finish to the treated fabric and to maintain the treated fabric flame retardant after repeated washing, which composition consists of a dispersion in water of dispersed matter consisting of 10–20% of antimony trioxide, 30–50% of a composite plasticizer and the rest a vinylic polymer selected from the group consisting of a homopolymer of vinyl chloride, a homopolymer of vinylidene chloride, a copolymer of vinyl chloride and vinylidene chloride and mixtures of said polymers, all of said proportions being proportions by weight of the total dispersed matter in said composition and said composite plasticizer being liquid, containing at least 15% by weight of chlorine and consisting of a mixture of a conventional plasticizer and a chlorine-containing plasticizer selected from the group consisting of chlorinated diphenyls and chlorinated paraffins.

Flame-retarding compositions of this formulation leave a soft handle on light-weight cotton and other fabrics treated therewith and the flame-retardant effect of the composition persists notwithstanding repeated laundering of the treated fabric.

This successful result is mainly due to the fact that the total content of plasticizer in the composition is larger than heretofore, the plasticizer being a composite one and consisting in part of a chlorinated plasticizer, i.e. a chlorinated diphenyl or chlorinated paraffin, and containing at least 15% of chlorine reckoned on the weight of the composite plasticizer. The presence of this chlorine in the composite plasticizer, permits, without loss in the flame-proofing effect of the composition, of the incorporation of sufficient total plasticizer therein to prevent the treated fabric from being stiff.

It is also essential for successful results:

(a) That the amount of composite plasticizer calculated on the total weight of dispersed matter should be from 30–50%. This ensures on the one hand that there will be sufficient chlorine contained in the plasticizer to give adequate flame-retardance and on the other that there will not be so much plasticizer present as to give a sticky finish on the treated fabric.

(b) That the amount of antimony oxide calculated on the total weight of dispersed matter should be from 10–20%. This ensures adequate flame proofing on the one hand and on the other ensures that there will not be an excess of antimony oxide such as would render the film applied to the treated fabric powdery and therefore of insufficient resistance to abrasion and washing.

The conventional plasticizers which may be used in the composition according to the invention may be:

Alkyl esters of aliphatic dicarboxylic acids, such as dioctyl adipate or dibutyl sebacate, or alkyl esters of aromatic dicarboxylic acids, such as dibutyl phthalate or dioctyl phthalate, or alkyl or aryl esters of phosphoric acid, such as tritolyl phosphate or trioctyl phosphate.

The chlorine-containing plasticizer may be a chlorinated paraffin containing between 40% and 70% by weight of chlorine, such as those sold under the trade name "Cereclor" by Imperial Chemical Industries Limited or a chlorinated diphenyl containing between 40% and 70% of chlorine such as those sold under the trade name "Aroclor" by Monsanto Chemical Company.

The two plasticizer constituents are used in such proportions that the total chlorine content of the mixture is not less than 15% and preferably at least 20%. If the chlorine content of the chlorine-containing plasticizer is towards the lower end of the above range, the proportion required to provide enough chlorine in the mixture is greater than if a chlorine-containing plasticizer of higher chlorine content is used.

The chlorinated hydrocarbons and diphenyls lower in chlorine are liquid, while those higher in chlorine are solids, but yield liquid mixtures with the conventional plasticizers. It is thus possible to produce a liquid mixture by mixing with the conventional plasticizer either a larger proportion of the low-chlorine compound or a smaller proportion of the high-chlorine compound, while maintaining the chlorine content of the mixture at the necessary level.

The following are examples of composite plasticizers which can be used in flame-retardant compositions in accordance with the invention:

|  | Example A | Example B |
|---|---|---|
| Conventional Plasticizer: Dioctyl Phthalate, percent. | 75 | 57 |
| Chlorinated Paraffin: | | |
| "Cereclor" 70 (solid, containing 70% chlorine), percent. | 25 | — |
| "Cereclor" 42 (liquid, containing 42% chlorine), percent. | — | 43 |
| Chlorine in composite plasticizer, percent | 17.5 | 18 |
| Condition of composite plasticizer | liquid | liquid |

In order to avoid the tendency for the antimony trioxide to settle out from the composition on storage I prefer to make the composition by first dispersing the antimony trioxide in the plasticizer, then emulsifying the resultant dispersion in water with the aid of an emulsifying agent and finally mixing the resultant emulsion with a latex of polyvinyl chloride or the like.

When the composition is prepared in this way, the antimony trioxide is dispersed in the plasticizer, i.e. in the oil phase of the emulsion, and not only is any undue tendency of the antimony trioxide to settle out prevented but I believe that the antimony trioxide is in more intimate contact with the polyvinyl chloride after curing of the treated fabric, thereby enhancing the flame-retardant effect, than is the case when the antimony oxide is dispersed in the aqueous phase of the emulsion.

In some cases, I find that the emulsion produced by agitating in water the dispersion of antimony trioxide in the plasticizer can only be formed as an oil-in-water emulsion by prolonged agitation, which is inconvenient. Sometimes, indeed, the emulsion can only be formed as a water-in-oil emulsion. In the latter case reversion to an oil-in-water emulsion takes place when the polyvinyl chloride latex is added, but the final product has a relatively low stability and may last only a week in the worst circumstances.

I find that production of the preliminary emulsion in the form of an oil-in-water emulsion can be greatly facilitated by lowering the pH value of the water used by addition of acid, e.g. acetic acid, and that it is advantageous to raise the pH value again after admixture with the polyvinyl chloride latex by addition of an alkali (e.g. ammonia), thereby ensuring optimum conditions for stability of the latex.

I find that formation of an oil-in-water preliminary emulsion is further facilitated by dissolving part of the emulsifying agent, in water-free form, in the plasticizer prior to dispersion therein of the antimony trioxide. This has the further advantage that it improves the wetting character of the plasticizer towards antimony trioxide so that milling is not essential to produce the dispersion, stirring being sufficient.

The following are examples of flame-retarding compositions according to the invention which have been found not to impart undue stiffness to lightweight fabrics, such as flannelette. In all cases the treated fabric retained its flame-retarding characteristic after repeated washing and scrubbing and after subjection to dry cleaning. In all the examples, the proportions are by weight.

(1)

"14.5 parts of "Aroclor" 1254 (containing 54% chlorine) were thoroughly mixed with 14.5 parts of dioctyl phthalate. The mixture was then emulsified in 15.6 parts of water with 4 parts of a 60% paste in water of Manoxol O.T. and 2 parts of a 2% solution in water of sodium carboxy-methyl-cellulose. 11.4 parts of antimony trioxide were then dispersed in this emulsion and the resulting dispersion mixed with 44 parts of polyvinyl chloride latex (52% polyvinyl chloride and 48% water) sold under the registered trade mark "Geon." The composition contained the following dry weight contents of the ingredients:

| | Percent |
|---|---|
| Polyvinyl chloride | 36 |
| Dioctyl phthalate | 23 |
| "Aroclor" | 23 |
| $Sb_2O_3$ | 18 |

Manoxol O.T. is dioctyl sodium sulphosuccinate and is an emulsifying agent originally developed by American Cyanamid Company under the name "Aerosol O.T." and now sold by Hardman and Holden Limited of Manchester under the name "Manoxol O.T."

(2)

As in Example 1, but the plasticizer consisting of 66% dioctyl phthalate and 34% of the same "Arocolor."

(3)

In this case the chlorine-containing plasticizer was "Cereclor," containing 45% chlorine.

A mixture of 362 parts of dioctyl phthalate and 362 parts of "Cereclor," containing 2 parts of Manoxol O.T. was ground with 367 parts of $Sb_2O_3$ and then emulsified with 2057 parts of "Geon" polyvinyl chloride latex and 500 parts of water containing 5 parts of a 60% paste in water of Manoxol O.T. and 25 parts of a 2% solution in water of sodium carboxy-methyl-cellulose. The composition contained the following dry weight contents of the ingredients:

| | Percent |
|---|---|
| Polyvinyl chloride | 49.5 |
| Dioctyl phthalate | 16.75 |
| "Cereclor" | 16.75 |
| $Sb_2O_3$ | 17.0 |

(4)

In this case the chlorine-containing plasticizer was "Cereclor," containing 54% chlorine.

The emulsion was prepared, as in Example 4, from 2057 parts of "Geon" polyvinyl chloride latex, 424 parts of dioctyl phthalate, 300 parts of "Cereclor" and 367 parts of $Sb_2O_3$. The composition contained the following dry weight contents of the ingredients:

| | Percent |
|---|---|
| Polyvinyl chloride | 49.5 |
| Dioctyl phthalate | 19.74 |
| "Cereclor" | 13.76 |
| $Sb_2O_3$ | 17.0 |

(5)

362 parts of the chlorinated diphenyl containing 54% chlorine and sold as "Aroclor" were dispersed by stirring in 1086 parts of dioctyl phthalate.

1.5 parts of dry Manoxol O.T. were dissolved in the mixture.

550 parts of antimony trioxide were stirred into the mixture until the antimony trioxide was completely dispersed.

780 parts of water containing 25 parts of a 2% solution of sodium carboxy-methyl-cellulose (stabilizer) and 10 parts of a 60% aqueous gel of Manoxol O.T. were added and the pH of the mixture adjusted to 2–3 by addition of 1 ml. glacial acetic acid.

Vigorous stirring of the mixture produced an oil in water emulsion in 12 minutes.

After addition of 2200 parts of polyvinyl chloride latex (52% polyvinyl chloride and 48% water) sold under the registered trademark "Geon" the pH of the mixture was adjusted to 8–9 by addition of 1.7 parts of ammonium hydroxide.

(6)

In this case the plasticizer consisted of a mixture of 400 parts of dioctyl phthalate and 300 parts of "Cereclor 42" which contains 42% chlorine. The chlorine content of this mixture was therefore 18%.

370 parts of Sb₂O₃ was ground into the plasticizer mixture which was then emulsified with 1500 parts of "Geon" polyvinyl chloride latex, 400 parts of water, 200 parts of a 16% solution in water of ammonium oleate and 200 parts of a 2% solution in water of sodium carboxy-methyl-cellulose.

The composition contained the following dry weight content of the ingredients:

| | Percent |
|---|---|
| Polyvinyl chloride | 42.2 |
| Dioctyl phthalate | 21.6 |
| "Cereclor 42" | 16.2 |
| Sb₂O₃ | 20.0 |

(7)

In this case the plasticizer consisted of a mixture of 540 parts of dioctyl phthalate and 180 parts of "Cereclor 70" which contains 70% chlorine. The chlorine content of this mixture was therefore 17.5%.

The solid "Cereclor 70" was dispersed in the dioctyl phthalate with the aid of heat, and the emulsion was then prepared as in Example 7. The composition contained the following dry weight content of the ingredients:

| | Percent |
|---|---|
| Polyvinyl chloride | 41.7 |
| Dioctyl phthalate | 28.9 |
| "Cereclor 70" | 9.6 |
| Sb₂O₃ | 19.8 |

The emulsion produced in accordance with any of the foregoing examples may be diluted with water, if desired, before application to the fabric. It may be applied by steeping the fabric in the dispersion and subsequently removing the surplus liquid by means of a wringer. After treatment the fabric is cured by heating in an oven at about 110° to 150° C. The time for heating depends on the amount of moisture retained by the fabric and may vary from about 2 to 10 minutes.

The composition according to the invention may be applied to materials other than fabric composed of, or containing a substantial proportion of, cellulosic material where a soft handle in the treated material is desired. It may also be applied to yarn composed of cellulosic fibres.

The effectiveness of inclusion of the antimony trioxide in the oil phase of the emulsion is demonstrated by the following experimental comparison of two emulsions of the same formulation in one of which the antimony trioxide was dispersed in the water phase while in the other the antimony trioxide was dispersed in the oil phase.

Two emulsions were made, both of the following formulation:

| | | |
|---|---|---|
| Dioctyl phthalate | gm | 480 |
| "Cereclor II" (42% chlorine) | gm | 240 |
| Manoxol O.T. | gm | 2 |
| Antimony trioxide | gm | 365 |
| Water | cc | 500 |
| 10% ammonium oleate in water | cc | 200 |
| 2% courlose solution in water (carboxy methyl cellulose) | cc | 100 |
| Polyvinyl chloride latex | gm | 1500 |

In each case the Manoxol O.T. was first dissolved in the mixture of dioctyl phthalate and Cereclor II which constituted the plasticizer. For emulsion 1, this mixture was then added in an agitated mixture of water, ammonium oleate and courlose solution. The antimony oxide was then dispersed in the resulting oil-in-water emulsion, being accordingly dispersed in the water phase.

For emulsion 2, the antimony oxide was dispersed in the plasticizer mixture. The creamy paste so obtained was then added to the agitated mixture of water, ammonium oleate and courlose solution to produce an oil-in-water emulsion in which the antimony oxide was dispersed in the oil phase.

In both cases the oil-in-water emulsion containing the plasticizers and antimony oxide was added to the stirred polyvinyl chloride latex to obtain the final emulsion.

Microscopic examination of the final emulsions showed the antimony oxide to be suspended in the continuous water phase in emulsion 1 while in emulsion 2 the antimony oxide was to be seen in the oil droplets.

The rate at which antimony oxide settled out from the two emulsions was measured by the use of an Oden Balance. The two experiments were carried out under identical conditions, using the same container for each emulsion. The Oden Balance is a standard apparatus for the measurement of sedimentation. It is essentially a normal balance, with one pan suspended in the liquid under examination. In these experiments this was achieved by suspending a glass pan and stirrup, in a vessel below the balance case, by means of a nylon thread passing through a hole in the floor of the balance case. The suspension was weighted so that when the pan was first immersed in the emulsion it was heavier than the other pan. The balance was counterpoised. As sedimentation on to the immersed pan occurred, weights were added to the other pan to maintain a balance. A record was kept of the weights needed after various time intervals, until a relatively constant state was reached. The results are tabulated below:

| Time | Weight in Grammes | |
|---|---|---|
| | Emulsion 2 Sb₂O₃ in oil | Emulsion 1 Sb₂O₃ in water |
| 0 | 0 | 0 |
| 15 mins | 0.2 | 1.6 |
| 30 mins | 0.5 | 3.0 |
| 45 mins | 0.7 | 4.0 |
| 1 hours | 0.9 | 4.7 |
| 1¼ hours | | 5.2 |
| 1½ hours | 1.2 | 5.7 |
| 1¾ hours | 1.3 | 6.1 |
| 2 hours | 1.4 | |
| 3 hours | 1.5 | 7.3 |
| 4 hours | 1.5 | 8.0 |
| 5½ hours | | 8.7 |
| 6½ hours | 1.5 | 9.0 |
| 22 hours | | 10.5 |
| 24 hours | 1.5 | 10.6 |
| 27 hours | | 10.7 |
| 30 hours | | 10.8 |
| 48 hours | 1.5 | 11.0 |

The results of these two experiments are plotted on the graphs in the accompanying drawing. It will be noted that the amount of sedimentation after 48 hours in emulsion 2 was over seven times that in emulsion 1.

What I claim as my invention and desire to secure by Letters Patent is:

1. A flame retarding composition for application to textile fabrics and adapted to impart a soft finish to the treated fabric and to maintain the treated fabric flame-retardant after repeated washing, which composition consists of a dispersion in water of dispersed matter consisting of 10–20% of antimony trioxide, 30–50% of a composite plasticizer and the rest a vinylic polymer selected from the group consisting of a homopolymer of vinyl chloride, a homopolymer of vinylidene chloride a copolymer of vinyl chloride and vinylidene chloride and mixtures of said polymers, all of said proportions being proportions by weight of the total dispersed matter in said composition and said composite plasticizer being liquid, containing at least 15% by weight of chlorine, and being constituted by a mixture of a plasticizer selected from the group consisting of alkyl esters of aliphatic dicarboxylic acids, alkyl esters of aromatic dicarboxylic acids, alkyl esters of phosphoric acid and aryl esters of phosphoric acid and a chlorine-containing plasticizer containing between 40% and 70% by weight of chlorine and selected from the group consisting of chlorinated diphenyls and chlorinated paraffins.

2. A composition as claimed in claim 1, wherein the composite plasticizer contains at least 20% by weight of chlorine.

3. A composition as claimed in claim 1, wherein the composite plasticizer consists of a mixture of dioctyl phthalate and a chlorinated paraffin containing between 40% and 70% chlorine.

4. A composition as claimed in claim 3, in which the composite plasticizer contains 75% by weight of dioctyl phthalate and 25% by weight of chlorinated paraffin containing 70% chlorine.

5. A composition as claimed in claim 3, in which the composite plasticizer contains 57% by weight of dioctyl phthalate and 43% by weight of chlorinated paraffin containing 42% chlorine.

6. A method of preparing a flame-retarding composition consisting of an emulsion whereof water constitutes the continuous phase of a vinylic polymer selected from the group consisting of a homopolymer of vinyl chloride, a homopolymer of vinylidene chloride, a copolymer of vinyl chloride and vinylidene chloride and mixtures of said polymers, a liquid plasticizer for said vinylic polymer and antimony trioxide, said plasticizer containing at least 15% by weight of chlorine and consisting of a mixture of a plasticizer selected from the group consisting of alkyl esters of aliphatic dicarboxylic acids, alkyl esters of aromatic dicarboxylic acids, alkyl esters of phosphoric acid and aryl esters of phosphoric acid and a chlorine-containing plasticizer containing between 40% and 70% by weight of chlorine and selected from the group consisting of chlorinated diphenyls and chlorinated paraffins, the disperse phase of said emulsion consisting substantially of 10–20% by weight of antimony trioxide, 30–50% by weight of said plasticizer and the rest said vinylic polymer, which method consists in first forming a dispersion of the antimony trioxide in said plasticizer, then forming with the aid of an emulsifying agent an emulsion in water of said dispersion and finally mixing said emulsion with a latex of said vinylic polymer.

7. A method according to claim 6, which includes the steps of utilizing acidified water for producing said emulsion and adding an alkali to the emulsion after admixture therewith of the latex.

8. A method according to claim 6, in which part of the emulsifying agent is dissolved in water-free form in the plasticizer prior to dispersion therein of the antimony trioxide.

9. A flame-retardant composition consisting of an emulsion, whereof the continuous phase consists of water and the disperse phase consists of separate components, one component being a dispersion of antimony trioxide in a liquid plasticizer containing at least 15% by weight of chlorine and of a mixture of a plasticizer selected from the group consisting of alkyl esters of aliphatic dicarboxylic acids, alkyl esters of aromatic dicarboxylic acids, alkyl esters of phosphoric acid and aryl esters of phosphoric acid and a chlorine-containing plasticizer containing between 40% and 70% by weight of chlorine and selected from the group consisting of chlorinated diphenyls and the other component being a vinylic polymer selected from the group consisting of a homopolymer of vinyl chloride, a homopolymer of vinylidene chloride, a copolymer of vinyl chloride and vinylidene chloride and mixtures of said polymers, said disperse phase consisting substantially of 10–20% by weight of antimony trioxide, 30–50% by weight of plasticizer and the rest vinylic polymer.

10. A composition as claimed in claim 7, wherein said plasticizer consists of a mixture of dioctyl phthalate and a chlorinated paraffin containing between 40% and 70% chlorine.

11. A flame-retardant composition consisting of an emulsion, whereof the continuous phase consists of water and the disperse phase consists of separate components, one component being a vinylic polymer selected from the group consisting of a homopolymer of vinyl chloride, a homopolymer of vinylidene chloride, a copolymer of vinyl chloride and vinylidene chloride and mixtures of said polymers, and the other component being a dispersion of antimony trioxide in a liquid plasticizer for said vinylic polymer, said plasticizer consisting of a mixture of a plasticizer selected from the group consisting of alkyl esters of aliphatic dicarboxylic acids, alkyl esters of aromatic dicarboxylic acids, alkyl esters of phosphoric acid and aryl esters of phosphoric acid and a chlorine-containing plasticizer containing between 40% and 70% by weight of chlorine and selected from the group consisting of chlorinated diphenyls and chlorinated paraffins, said disperse phase consisting substantially of 10–20% by weight of antimony trioxide, 30–50% by weight of plasticizer and the rest vinylic polymer.

References Cited in the file of this patent

UNITED STATES PATENTS 2,421,409    Brookman et al.    June 3, 1947
2,591,368    McCarthy    Apr. 1, 1952